(12) United States Patent
Bahei-Eldin et al.

(10) Patent No.: US 12,176,501 B2
(45) Date of Patent: Dec. 24, 2024

(54) CONTROL UNITS, SYSTEMS, AND METHODS FOR PREHEATING BATTERIES

(71) Applicant: Rivian IP Holdings, LLC, Plymouth, MI (US)

(72) Inventors: Khaled Bahei-Eldin, Irvine, CA (US); Ming Ma, South San Francisco, CA (US); Curtis Wesley Chauvin, Orange, CA (US); Srivardhan Chandrapati, Mission Vijeo, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 520 days.

(21) Appl. No.: 17/564,965

(22) Filed: Dec. 29, 2021

(65) Prior Publication Data

US 2023/0207918 A1 Jun. 29, 2023

(51) Int. Cl.
| | |
|---|---|
| *H02J 7/04* | (2006.01) |
| *H01M 10/42* | (2006.01) |
| *H01M 10/44* | (2006.01) |
| *H01M 10/613* | (2014.01) |
| *H01M 10/615* | (2014.01) |
| *H01M 10/63* | (2014.01) |
| *H01M 10/6554* | (2014.01) |
| *H01M 10/6556* | (2014.01) |
| *H02J 7/00* | (2006.01) |

(52) U.S. Cl.
CPC ......... *H01M 10/63* (2015.04); *H01M 10/425* (2013.01); *H01M 10/443* (2013.01); *H01M 10/613* (2015.04); *H01M 10/615* (2015.04); *H01M 10/6554* (2015.04); *H01M 10/6556* (2015.04); *H02J 7/00032* (2020.01); *H02J 7/0048* (2020.01)

(58) Field of Classification Search
None
See application file for complete search history.

(56) References Cited

U.S. PATENT DOCUMENTS

| | | | |
|---|---|---|---|
| 2011/0191266 A1* | 8/2011 | Matsuyama | G06Q 50/06 705/412 |
| 2012/0217933 A1* | 8/2012 | Abe | H01M 10/615 320/128 |
| 2022/0289072 A1* | 9/2022 | Jeon | B60L 58/12 |

* cited by examiner

*Primary Examiner* — Arun C Williams
(74) *Attorney, Agent, or Firm* — Patterson + Sheridan, LLP (57) ABSTRACT

Various disclosed embodiments include illustrative control units, systems, and methods. In an illustrative embodiment, a control unit includes a processor and non-transitory computer-readable media that stores computer-executable instructions configured to cause the processor to determine a start charging time, receive a battery temperature value, and instruct the thermal control system to start heating the battery responsive to the start charging time and the battery temperature value in an energy saving way.

15 Claims, 7 Drawing Sheets

CONTROL UNITS, SYSTEMS, AND METHODS FOR PREHEATING BATTERIES

INTRODUCTION

The present disclosure relates to various charging systems, such as those for electric vehicles and energy storage systems for homes, buildings, and/or other structures, among other possibilities. The statements in this section merely provide background information related to the present disclosure and may not constitute prior art.

Stationary electrical power storage systems that include electrical batteries may be installed outdoors or at a location having low thermal insulation thus being exposed to cold or hot weather climates. Once battery cell temperatures get too low or high, commonly used battery cell types may be prevented from charging at a predefined rate by the chemical limitations of battery materials. Battery temperatures may need to be continually heated or cooled by external heaters or coolers in order to keep the batteries to the proper temperature window for both charge and discharge performance. However, continually running heaters or coolers becomes costly due to consumption of a significant amount of energy.

BRIEF SUMMARY

Various disclosed embodiments include illustrative control units, systems, and methods. In an illustrative embodiment, computer-executable instructions are configured to cause a processor and/or controller to determine a charging time and a temperature of a battery, such as the current and/or ambient temperature of the battery. The instructions further cause the processor to modify the temperature of the battery based on the charging time.

In an illustrative embodiment, a control unit includes a processor and non-transitory computer-readable media that stores computer-executable instructions configured to cause the processor to determine a start charging time, receive a battery temperature value, and instruct the thermal control system to start heating the battery responsive to the start charging time and the battery temperature value.

In another illustrative embodiment, a system includes a battery, a thermal control system reads and controls battery temperature, and a control unit that is in signal communication with the thermal control system. The control unit includes a processor and non-transitory computer-readable media that stores computer-executable instructions configured to cause the processor to determine a start charging time, receive a battery temperature value, and instruct the thermal control system to start heating the battery responsive to the start charging time and the battery temperature value to avoid unnecessary energy loss.

In another illustrative embodiment, a method includes determining a start charging time, receiving a battery temperature value, and starting battery heating responsive to the start charging time and the battery temperature value.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

Illustrative embodiments are illustrated in referenced figures of the drawings. It is intended that the embodiments and figures disclosed herein are to be considered illustrative rather than restrictive.

Like reference symbols in the various drawings generally indicate like elements.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Various disclosed embodiments include illustrative control units, systems, and methods. As will be explained below, such embodiments can dynamically determine when to begin heating a battery for timely charging.

Figure 1:
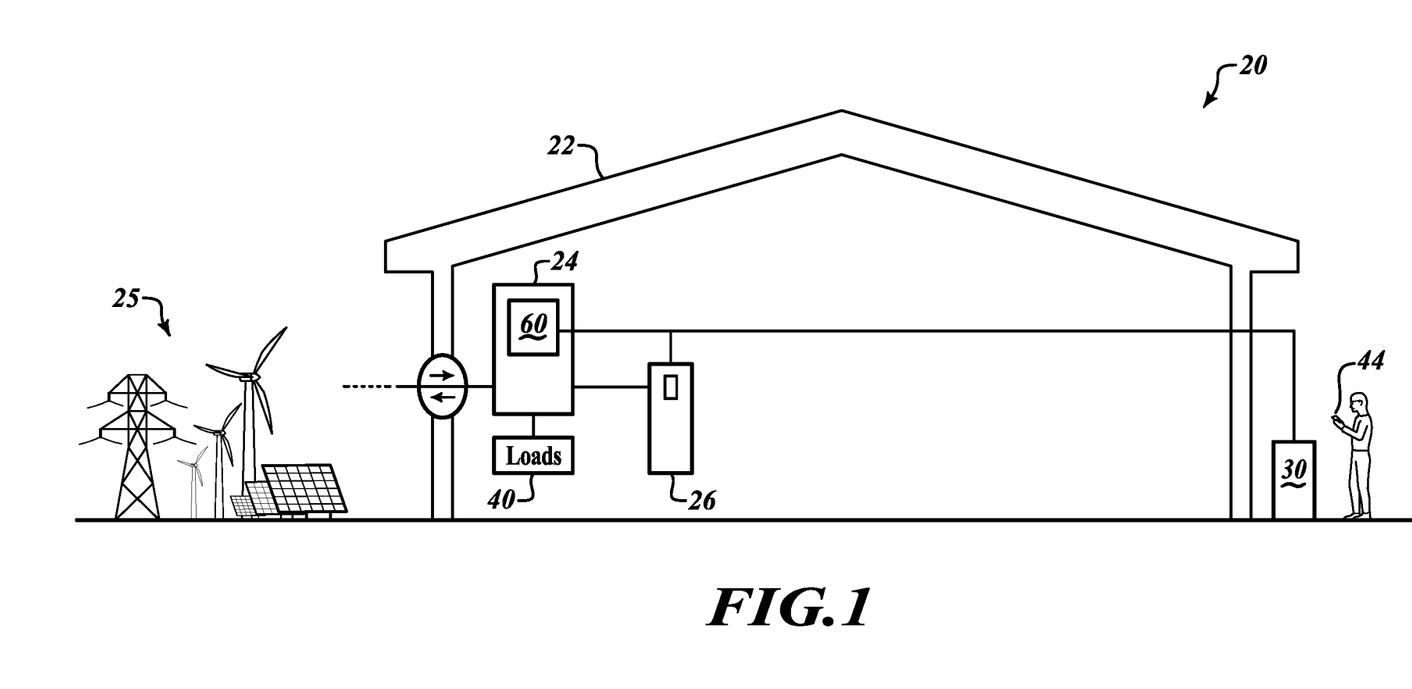
FIG. 1 is a schematic diagram of an illustrative backup battery system.
Figure 2:
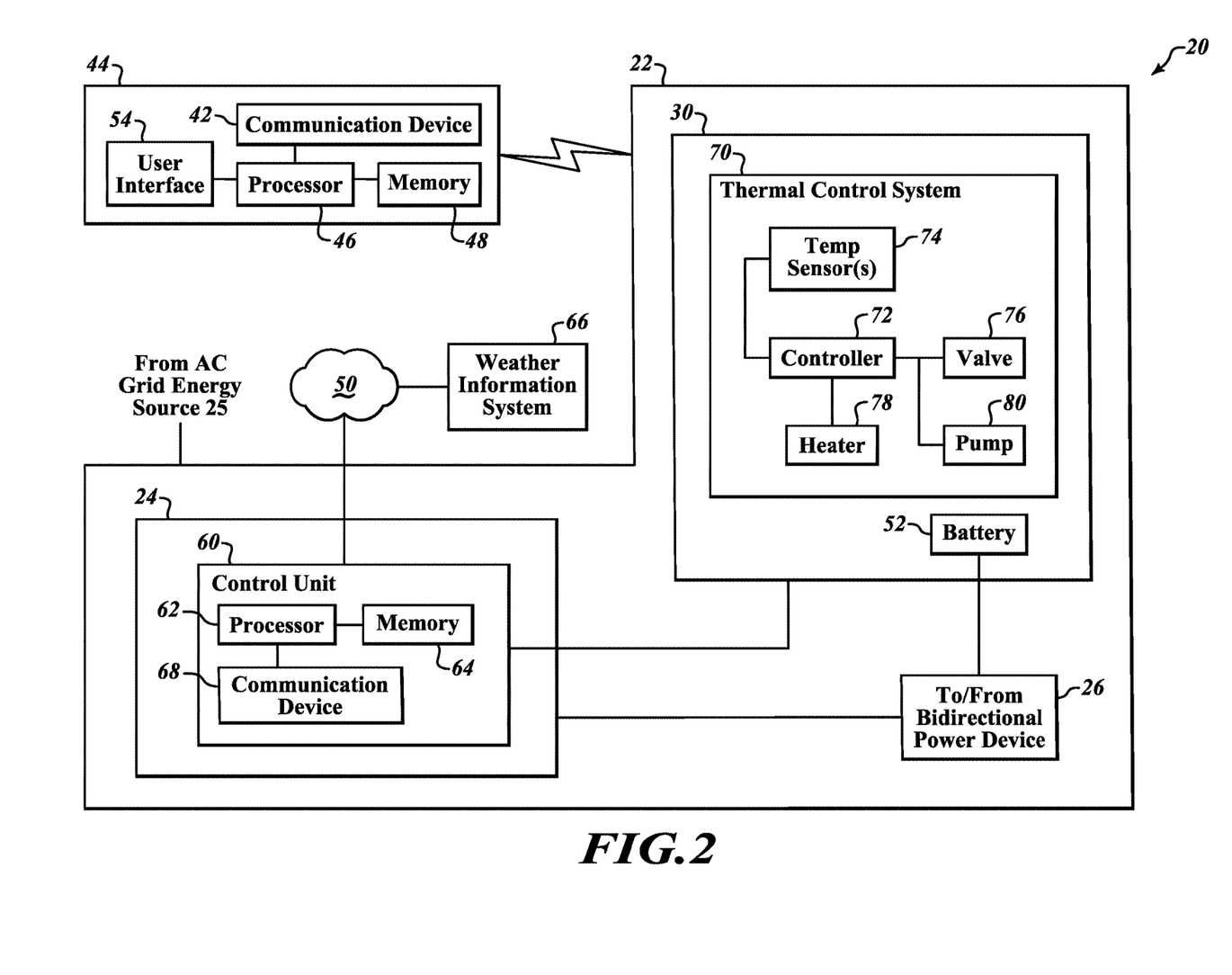
FIG. 2 is a block diagram of the system of FIG. 1.

Given by way of non-limiting overview and referring to FIGS. 1 and 2, in various embodiments a system 20 dynamically determines a battery heat start time responsive to a determination of a battery charging time. The system 20 includes a battery 52, a thermal control system 70 that controls the temperature of the battery 52, and a control unit 60 in signal communication with the thermal control system 70. The control unit 60 includes a processor 62 and non-transitory computer-readable media (memory 64) that stores computer-executable instructions configured to cause the processor 62 to determine a start charging time, receive a battery temperature value, and instruct the thermal control system 70 to start heating the battery 52 responsive to the start charging time and the battery temperature value.

Now that an overview has been presented by way of illustration only and not of limitation, details will be set forth by way of non-limiting examples given by way of illustration only and not of limitation. First, the illustrative system 20 will be explained by way of non-limiting examples given by way of illustration only. Then, illustrative processes for dynamically determining a start time for heating a battery will be explained by way of non-limiting examples given by way of illustration only.

As shown in FIG. 1, in various embodiments the illustrative system 20 is configured to dynamically adjust a start time for heating the battery 52. In various embodiments the system 20 may be included in a structure 22. The structure 22 may be a a residential structure, such as a house, a townhouse, a condominium, an apartment building, or the like, or a business structure such as an office building, a store, a factory, a warehouse, a hospital, or the like, or any other structure capable of connecting to an alternating current (AC) grid energy source 25 or other external energy supply/source. The system 20 includes a bidirectional power device 26, a control center 24, and electrical loads 40. In various embodiments the control center 24 receives AC electrical power from the AC grid energy source 25 and delivers the AC electrical power to the electrical loads 40 responsive to the system 20 being in a normal operations mode. The control center 24 also delivers the AC electrical power to a battery unit 30 responsive to the system 20 being in an energy storage operations mode. The control center 24 receives electrical power from the battery unit 30 via the bidirectional power device 26 responsive to the system 20 being in a backup power operations mode. The battery unit 30 or portions of the battery unit 30 may be located external to the structure 22 with exposure to temperatures below a charging temperature threshold. In various embodiments the control center 24 may include the control unit 60, circuit breakers, and other electrical system control devices. The control unit 60 is described in more detail below. The system 20 may also include or be in data communication with a personal electronics device (PED) 44. The PED 44 provides backup power information to a system user. The PED 44 is described in more detail below.

In various embodiments, the grid AC supply 25 may provide AC electrical power from a variety of different devices, such as wind turbine, solar cell, geothermal, nuclear power plants, hydro-electric power plants, natural gas power plants, coal-run power plants, or any mechanism that can produce AC electrical power.

In various embodiments and given by way of example only and not of limitation, the battery 52 suitably includes high energy rechargeable batteries that store electrical charge, discharge electrical current upon request, and recharge. The rechargeable batteries may be structured in any desirable form, such as without limitation, cylindrical, pouch, prismatic, massless, or other comparable forms. In various embodiments the rechargeable batteries may include Iron-air batteries, Li-ion batteries, such as, without limitation, Nickel Cobalt Aluminium, Lithium Manganese Cobalt, or Lithium Manganese Oxide batteries. However, other materials may be used that provide comparable recharging, energy density, and energy discharge capabilities.

As shown in FIG. 2, in various embodiments the illustrative battery unit 30 may include the thermal control system 70 and the battery 52. The thermal control system 70 includes a controller 72, a temperature sensor(s) 74, a valve 76, a battery thermal plate 86, a heater 78, and a pump 80. The temperature sensor(s) 74 may include ambient temperature sensors, coolant (thermal fluid) temperature sensors, battery temperature sensors, or other types of temperature sensors. Other heating systems may be used, such as, without limitation, air or direct coil heaters. Also, portions of the thermal control system 70 may be located within the structure 22 with conduit for transporting thermal fluid from the pump 80 or the heater 78 located within the structure 22 and into the battery thermal plate 86, also referred to as a cold plate 86, located external to the structure 22. If the thermal control system 70 also performs a cooling function, the thermal control system 70 includes a fan and radiator.

In various embodiments the illustrative control unit 60 determines a battery charging start time responsive to weather information or other battery use information, determines a battery heating start time responsive to the battery charging start time, and instructs the controller 72 begin battery heating response to the determined battery heating start time. The control unit 60 includes a communication device 68, the processor 62, and the non-transitory computer-readable media (the memory 64) configured to store computer-executable instructions that cause the processor 62 to control operations of the thermal control system 70.

In various embodiments the illustrative PED 44 provides information to a system user regarding battery heating and charging operations. The PED 44 may be a smartphone, tablet, smartwatch, or any device capable of providing information to a user. The PED 44 includes a processor 46, non-transitory computer-readable media (memory 48), a communication device 42, and a user interface device 54. The memory 48 stores instructions configured to cause the processor 46 to receive information from a user and send information to the user via the user interface device 44. The information may include state of the battery 52, when battery charging is expected to begin, when battery heating is determined to begin, or other related information.

In various embodiments the system 20 may include a weather information system 66 that provides forecast weather information accessible to the system 20. The weather information system 66 is in data communication with the control unit 60 and/or the thermal control system 70 via a network 50. The weather information system 66 provides various weather information via a network 50 to the control unit 60. The network 50 may be a public or private data network, such as without limitation, a cellular network, a local area network (LAN), a wide area network (WAN), or the like.

In various embodiments the bidirectional power device 26 converts AC received from the AC grid energy source 25 to direct current (DC) electrical power for charging the and converts DC electrical power from the battery 52 or an alternate DC electrical power source(s) 34 back to AC electrical power when commanded. The alternate DC electrical power sources may include a wind turbine, a solar panel, geothermal device, a hydro-electric device, or other DC electrical power sources.

In various embodiments the control unit 60 may communicate with the battery unit 30 and with numerous other components via a network, such as a network bus like a peer-to-peer network bus, such as a controller area network (CAN) bus. Other network buses, such as a LAN, a WAN, or a value-added network (VAN), may also be used for enabling communication between the components connected to the network.

In various embodiments the memory 64 is configured to store computer-executable instructions. Responsive to the stored instructions, the processor 62 is configured to receive information from the battery unit 30 and the weather information system 66 and send information/instructions to the controller 72 for instructing the controller 72 when to deactivate a heating operations mode.

In various embodiments the memory 64 stores computer-executable instructions configured to cause the processor 62 to perform various battery management functions such as, without limitation, determine a start charging time, receive a battery temperature value, and instruct the thermal control system 70 to start heating the battery 52 responsive to the start charging time and the battery temperature value.

In various embodiments the instructions stored in the memory 64 are further configured to cause the processor 62 to receive weather information via the communications device 68 and determine the start charging time and/or time to start battery heating responsive to the received weather information. The weather information may include a prediction of wind information, a prediction of temperature information, and/or a prediction of solar information, such as solar irradiance. The prediction of wind information may be used by the processor 62 to determine when a preferred wind is expected for charging the battery 52 via an associated wind turbine. The prediction of solar information may be used by the processor 62 to determine when a preferred amount of solar energy is expected for charging the battery 52 via solar panels. The prediction of temperature information and solar information may be used by the processor 62 to determine what additional battery heating sources might be available for heating the battery 52 to a desirable charging temperature. These additional heat sources may increase the rate of heating the battery 52, thus allowing the processor 62 to use less power by the heater 78 or start the heating operations mode at a later time.

In various embodiments the instructions are further configured to cause the processor 62 to instruct the thermal control system 70 to start heating further responsive to the battery temperature value being below a previously defined charging temperature. If the battery temperature value is greater than the previously defined charging temperature, the thermal control system 70 is not instructed to provide heat to the battery 52.

In various embodiments the instructions are further configured to cause the processor 62 to instruct the controller 72 to command the valve 76 to toggle to a heat cycle, to command the heater 78 to heat thermal fluid, and to command the pump 80 to send the heated thermal fluid to the battery thermal plate 86.

In various embodiments the communication devices 42 and 68 may include any suitable wired or wireless device (such as a transceiver or the like) configured to communicate with each other and with the other communication devices using various network access devices, methods, and/or protocols, such as, without limitation, a wireless (Wi-Fi, Bluetooth) connection with a network portal/modem/router, a wired or wireless connection, or the like.

In various embodiments the processing described herein for dynamically determining a battery heating start time may be performed at or distributed between any of the processing locations, such as, without limitation, the processors 46 and 62. As discussed herein, in various embodiments the processors 46 and 62 suitably may include computer processors, data processors, or the like, that are configured to execute instructions received from external sources or stored in local memory 48 and 64.

As discussed herein, in various embodiments the memory 48 and 64 include non-transitory computer-readable storage medium that include computer-readable code (instructions) stored thereon for causing the respective processors 46 and 62 to perform functions as described and claimed herein. Examples of such computer-readable storage mediums include, but are not limited to, a hard disk, an optical storage device, a magnetic storage device, a Read-Only Memory (ROM), a Programmable Read-Only Memory (PROM), an Erasable Programmable Read-Only Memory (EPROM), an Electrically Erasable Programmable Read-Only Memory (EEPROM), flash memory, and the like. When stored in the non-transitory computer-readable medium, software can include the instructions executable by the respective processors 46 and 62 that, in response to such execution, causes performance of a set of operations, steps, methods, processes, algorithms, functions, techniques, etc. as described herein for the various embodiments.

Figure 3:
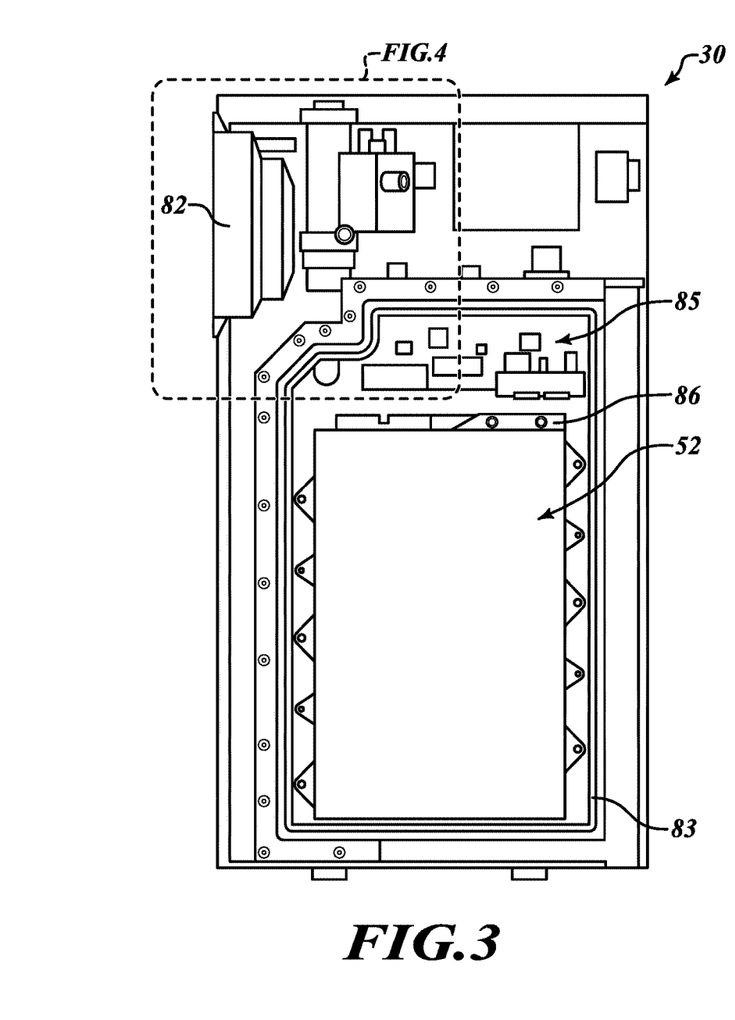
FIG. 3 is an x-ray view of an illustrative battery unit of the system of FIGS. 1 and 2.
Figure 4:
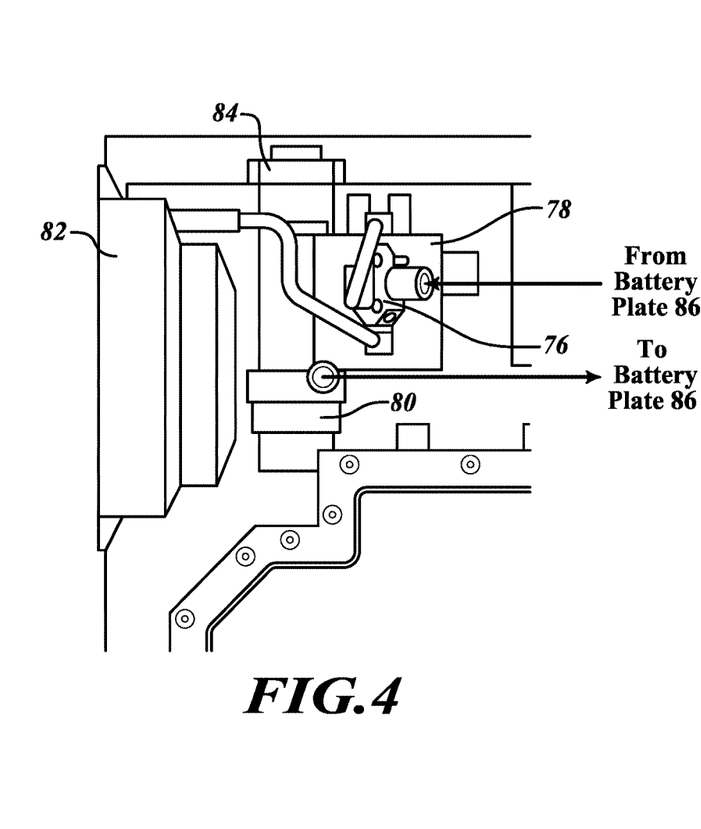
FIG. 4 is zoomed-in view of the battery unit of FIG. 3.

Referring additionally to FIGS. 3 and 4, in various embodiments the illustrative battery unit 30 may be a self-contained structure that includes a battery case 83 that includes an electronics section 85. The battery case 83 attaches to the battery thermal plate 86. The battery unit 30 also includes a section that houses the valve 76, the heater 78, the coolant pump 80, the temperature sensor(s), a coolant reservoir 84, and a fan and radiator 82 used for a cooling operations mode. The electronics section 85 includes the controller 72 and other comments are contrary configured to connect the controller 72 to the various other components of the battery unit 30 and to the controller unit 60.

Figure 5:
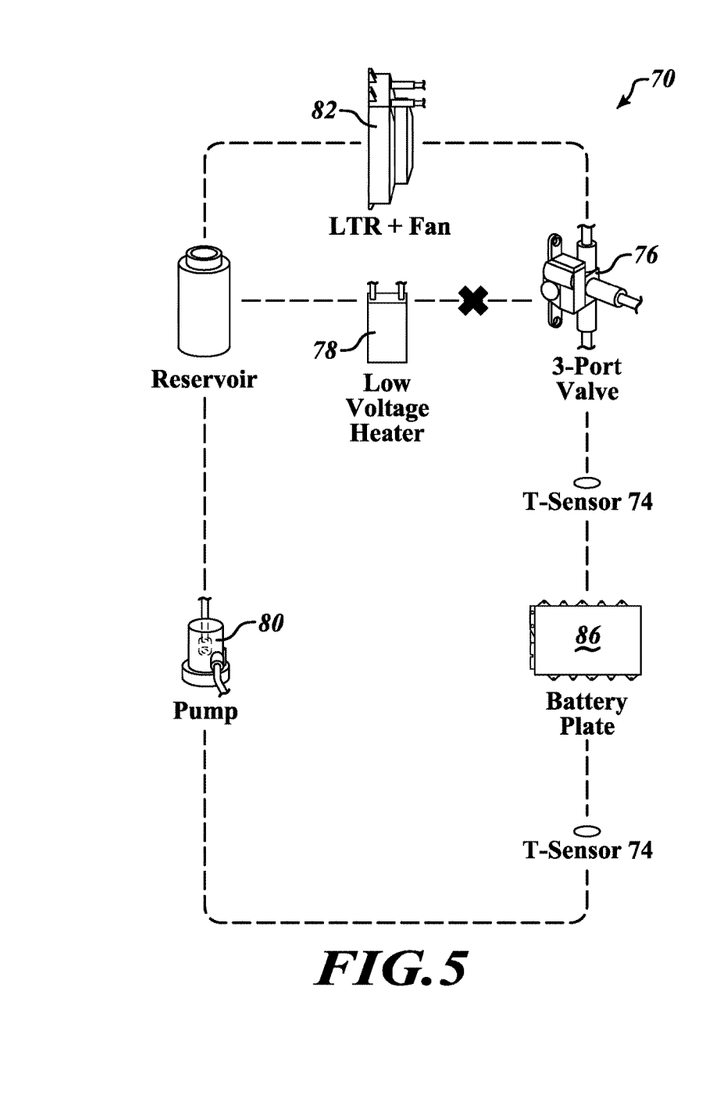
FIG. 5 is a schematic diagram of an illustrative thermal circuit of the battery unit of FIG. 3 in a cooling mode.
Figure 6:
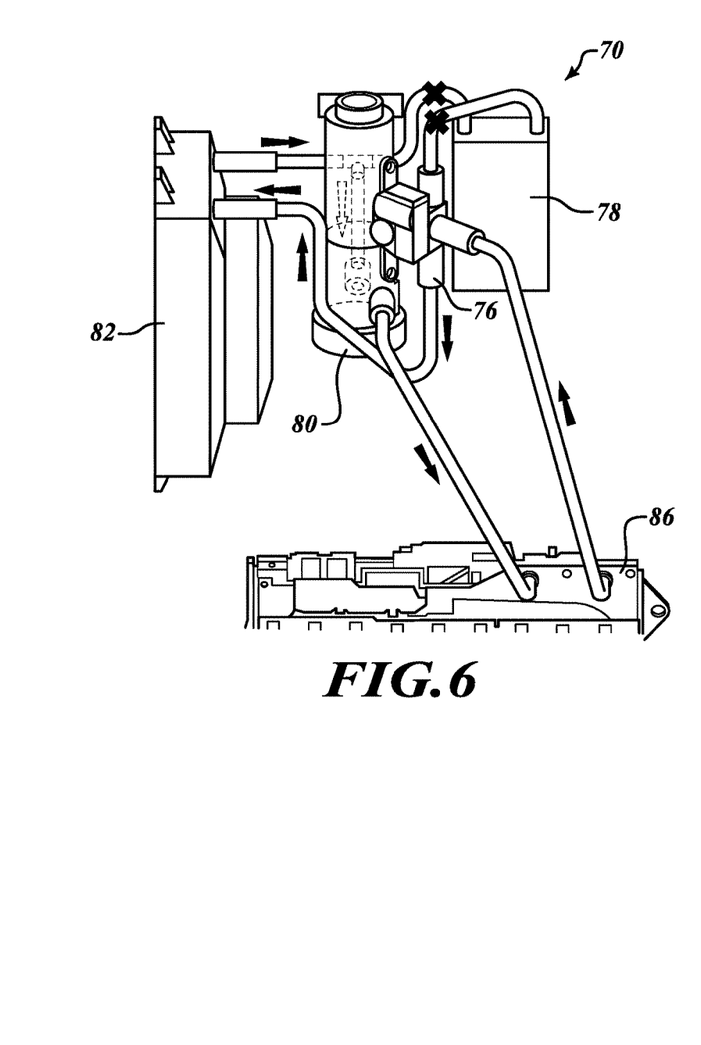
FIG. 6 is a view of illustrative components of the battery unit of FIG. 3 in the cooling mode.

Referring additionally to FIGS. 5 and 6, in various embodiments the thermal control system 70 is instructed to be in a cooling mode of operation. The controller 72 is instructed to cause the valve 76 to direct thermal fluid through the fan and radiator 82 and thus bypassing the heater 78. The heater 78 would not receive instructions to turn on and the pump 80 would be activated for directing thermal fluid from the fan and radiator 82 to the battery thermal plate 86.

Figure 7:
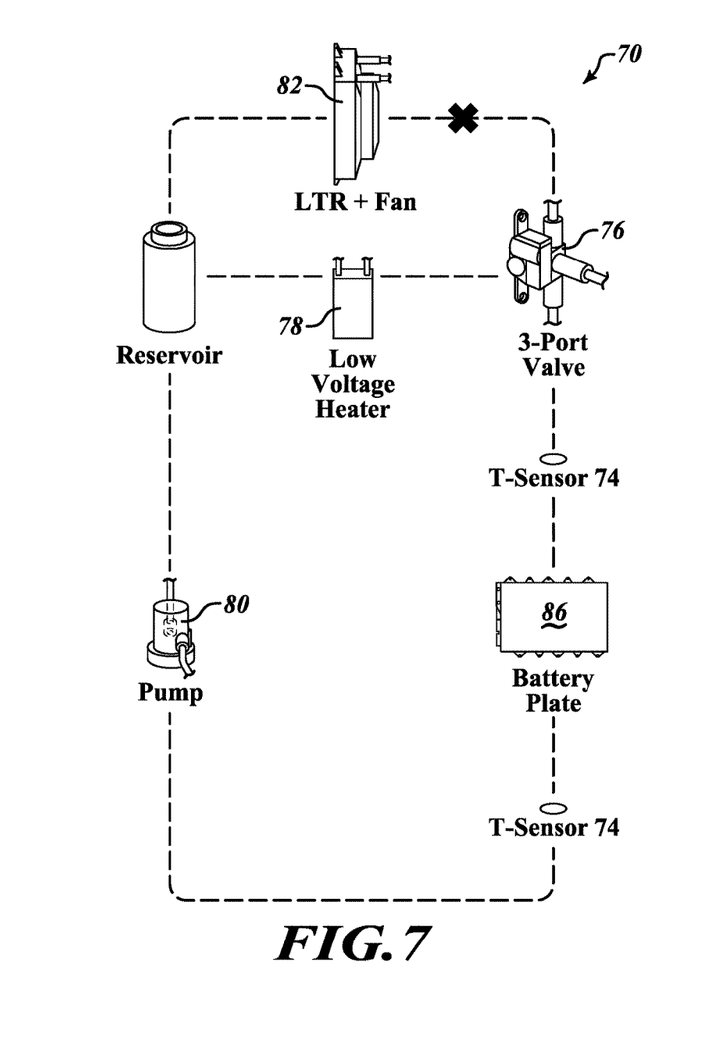
FIG. 7 is a schematic diagram of an illustrative thermal circuit of the battery unit of FIG. 3 in a heating mode.
Figure 8:
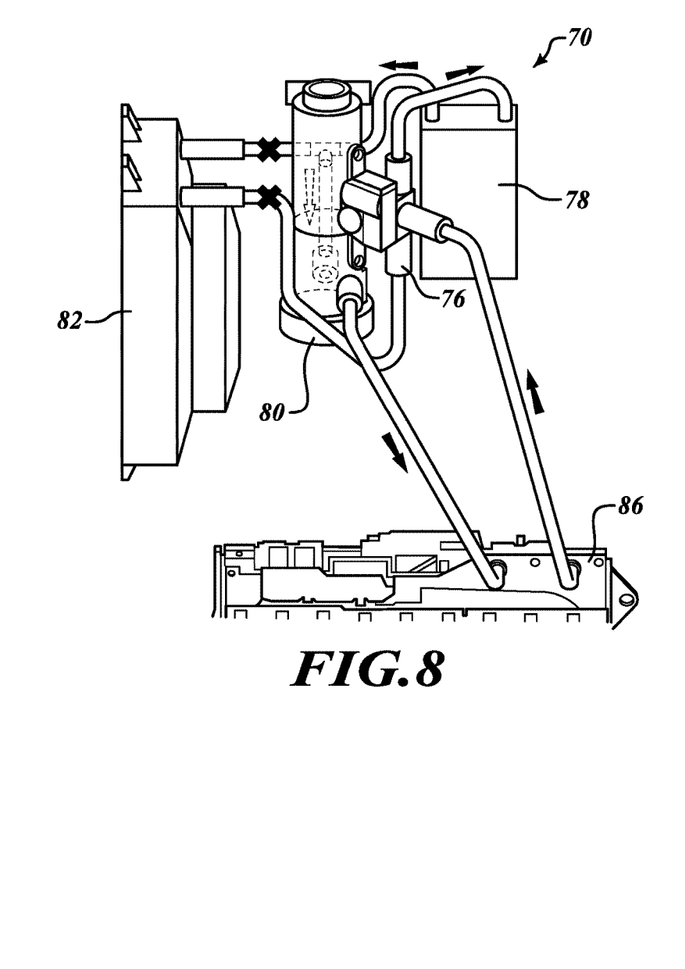
FIG. 8 is a view of illustrative components of the battery unit of FIG. 3 in the heating mode.

Referring additionally to FIGS. 7 and 8, in various embodiments the thermal control system 70 is instructed to be in a heating mode of operation. The controller 72 is instructed to cause the valve 76 to direct thermal fluid through the heater 78, thus bypassing the fan and radiator 82. The heater 78 would receive instructions to turn on and the pump 80 would be activated for directing thermal fluid from the heater 78 to the battery plate 86.

Now that the system 20 has been described, illustrative processes for establishing/dynamically adjusting reserve power limits for a battery will be explained by way of non-limiting examples given by way of illustration only.

Figure 9:
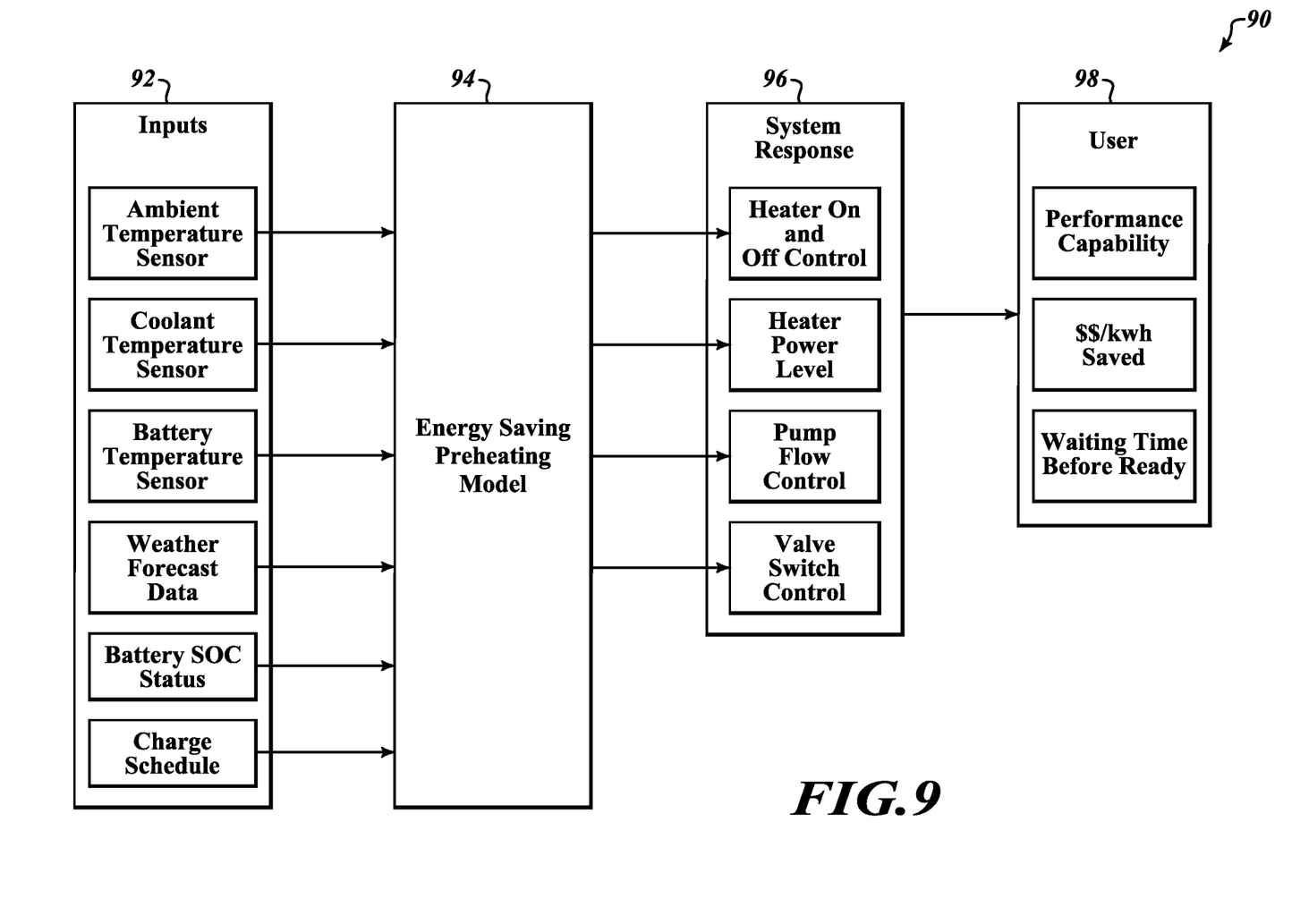
FIG. 9 is a diagram of illustrative data flow in the system of FIG. 2.

Referring additionally to FIG. 9, in various embodiments an illustrative data flow 90 presents types of data that flows through components of a system that controls battery heating in a cold environment. The data flow 90 includes a plurality of inputs 92 that are analyzed by a processor according to a previously defined energy-saving preheating model 94. The inputs 92 may include information from temperature sensors, such as, without limitation, ambient temperature sensors, coolant temperature sensors, battery temperature sensors, or the like), weather forecast data from a weather information source, the battery state of charge information (battery status) and charge schedule information from the processor, or other related information. The charge schedule is determined based on the load forecast and solar irradiance forecast. The load forecast is prediction of future load based on historical load data. The historical load data is any home load data prior to the current time. The historical load data may be recorded from the previous hour, the previous day or the same weekday load as the current day. The historical load data may be 15 minute data that shows how much kWh a home has drawn in the preceding 15 minutes. The historical load data and weather forecast data determine what the load will be, how much solar power will be produced and how much excess solar power beyond serving the load will be available. The excess solar power is the charging power available for the stationary battery. Based on the load forecast and usage mode of the battery, when battery cell temperature sensor reading is below the target value to deliver requested charging rate, the charging schedule would request the heater on for a certain amount of waiting time calculated by a thermal control algorithm. The heater will be off for the rest of the time window when charging/discharge request is low/none based on the historical user profile and solar irradiance forecast. The energy-saving preheating model 94 provides system response signals 96 for controlling various components of the thermal control system 70. The system response signals 96 may include heater On and Off control signals, a heater power level signal, a pump flow control signal, a valve switch control signal, or other signals, such as, without limitation, a fan control signal. Data 98 for a user may be sent to the PED 44 for providing useful information to the user via the user interface 54.

Figure 10:
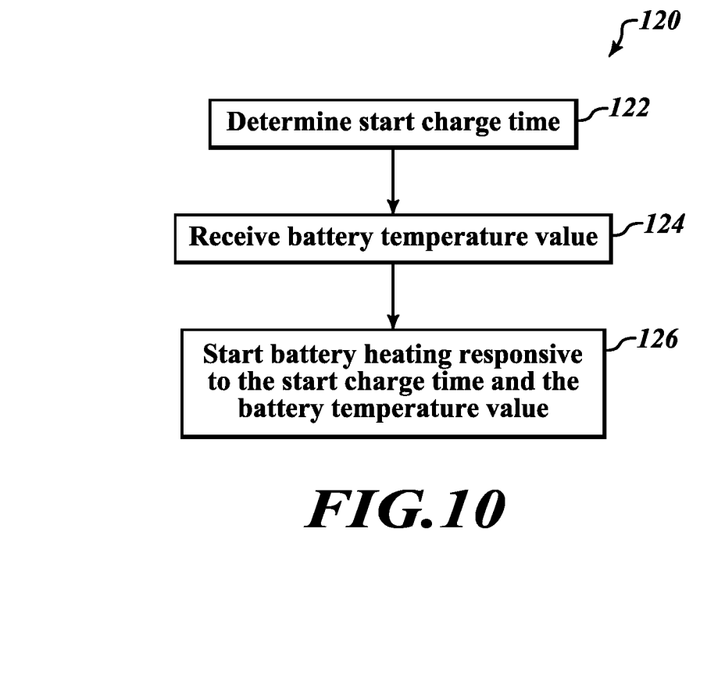
FIG. 10 is a flow diagram of an illustrative method for controlling heating of a backup battery exposed to cold weather.

Referring additionally to FIG. 10, in various embodiments an illustrative process 120 is provided for by a control unit executing instructions stored in a memory. At a block 122, start time for charging a battery is determined. At a block 124, a battery temperature value is received or determined from other temperature information. At a block 126, battery heating is started responsive to the determined charging start time and the battery temperature value.

Figure 11:
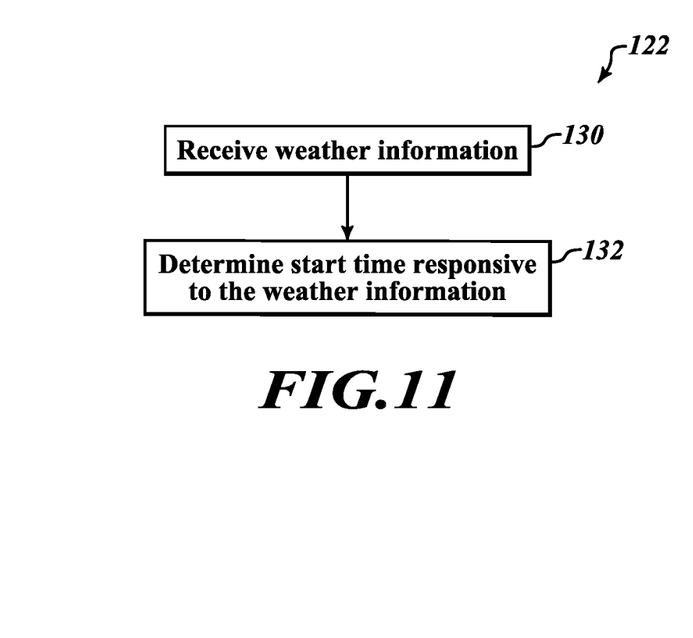
FIG. 11 is flow diagram of details of the method of FIG. 10.

Referring additionally to FIG. 11, additional illustrative details will be explained regarding portions of the process 120. For example, in various embodiments the process performed at the block 122 (FIG. 10) may be expanded upon. At a block 130, weather information is received. At a block 132, the charging start time is determined responsive to the received weather information.

In some embodiments the weather information may include solar, wind, temperature, or other weather-related information.

In some embodiments the instruction to start heating is further responsive to the battery temperature value being below a previously defined charging temperature.

Those skilled in the art will recognize that at least a portion of the controllers, devices, units, and/or processes described herein can be integrated into a data processing system. Those having skill in the art will recognize that a data processing system generally includes one or more of a system unit housing, a video display device, memory such as volatile or non-volatile memory, processors such as microprocessors or digital signal processors, computational entities such as operating systems, drivers, graphical user interfaces, and applications programs, one or more interaction devices (e.g., a touch pad, a touch screen, an antenna, etc.), and/or control systems including feedback loops and control motors (e.g., feedback for sensing position and/or velocity; control motors for moving and/or adjusting components and/or quantities). A data processing system may be implemented utilizing suitable commercially available components, such as those typically found in data computing/communication and/or network computing/communication systems.

The term controller/processor, as used in the foregoing/following disclosure, may refer to a collection of one or more components that are arranged in a particular manner, or a collection of one or more general-purpose components that may be configured to operate in a particular manner at one or more particular points in time, and/or also configured to operate in one or more further manners at one or more further times. For example, the same hardware, or same portions of hardware, may be configured/reconfigured in sequential/parallel time(s) as a first type of controller (e.g., at a first time), as a second type of controller (e.g., at a second time, which may in some instances coincide with, overlap, or follow a first time), and/or as a third type of controller (e.g., at a third time which may, in some instances, coincide with, overlap, or follow a first time and/or a second time), etc. Reconfigurable and/or controllable components (e.g., general purpose processors, digital signal processors, field programmable gate arrays, etc.) are capable of being configured as a first controller that has a first purpose, then a second controller that has a second purpose and then, a third controller that has a third purpose, and so on. The transition of a reconfigurable and/or controllable component may occur in as little as a few nanoseconds, or may occur over a period of minutes, hours, or days.

In some such examples, at the time the controller is configured to carry out the second purpose, the controller may no longer be capable of carrying out that first purpose until it is reconfigured. A controller may switch between configurations as different components/modules in as little as a few nanoseconds. A controller may reconfigure on-the-fly, e.g., the reconfiguration of a controller from a first controller into a second controller may occur just as the second controller is needed. A controller may reconfigure in stages, e.g., portions of a first controller that are no longer needed may reconfigure into the second controller even before the first controller has finished its operation. Such reconfigurations may occur automatically, or may occur through prompting by an external source, whether that source is another component, an instruction, a signal, a condition, an external stimulus, or similar.

For example, a central processing unit/processor or the like of a controller may, at various times, operate as a component/module for displaying graphics on a screen, a component/module for writing data to a storage medium, a component/module for receiving user input, and a component/module for multiplying two large prime numbers, by configuring its logical gates in accordance with its instructions. Such reconfiguration may be invisible to the naked eye, and in some embodiments may include activation, deactivation, and/or re-routing of various portions of the component, e.g., switches, logic gates, inputs, and/or outputs. Thus, in the examples found in the foregoing/following disclosure, if an example includes or recites multiple components/modules, the example includes the possibility that the same hardware may implement more than one of the recited components/modules, either contemporaneously or at discrete times or timings. The implementation of multiple components/modules, whether using more components/modules, fewer components/modules, or the same number of components/modules as the number of components/modules, is merely an implementation choice and does not generally affect the operation of the components/modules themselves. Accordingly, it should be understood that any recitation of multiple discrete components/modules in this disclosure includes implementations of those components/modules as any number of underlying components/modules, including, but not limited to, a single component/module that reconfigures itself over time to carry out the functions of multiple components/modules, and/or multiple components/modules that similarly reconfigure, and/or special purpose reconfigurable components/modules.

In some instances, one or more components may be referred to herein as "configured to," "configured by," "configurable to," "operable/operative to," "adapted/adaptable," "able to," "conformable/conformed to," etc. Those skilled in the art will recognize that such terms (for example "configured to") generally encompass active-state components and/or inactive-state components and/or standby-state components, unless context requires otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (for example, "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (for example, the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software (e.g., a high-level computer program serving as a hardware specification), firmware, or virtually any combination thereof, limited to patentable subject matter under 35 U.S.C. 101. In an embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, limited to patentable subject matter under 35 U.S.C. 101, and that designing the circuitry and/or writing the code for the software (e.g., a high-level computer program serving as a hardware specification) and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link (e.g., transmitter, receiver, transmission logic, reception logic, etc.), etc.).

With respect to the appended claims, those skilled in the art will appreciate that recited operations therein may generally be performed in any order. Also, although various operational flows are presented in a sequence(s), it should be understood that the various operations may be performed in other orders than those which are illustrated or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

While the disclosed subject matter has been described in terms of illustrative embodiments, it will be understood by those skilled in the art that various modifications can be made thereto without departing from the scope of the claimed subject matter as set forth in the claims.

What is claimed is:

1. A control unit comprising:
    a processor configured to receive and send information to components of a structure via a communication device; and
    non-transitory computer-readable media configured to store computer-executable instructions configured to cause the processor to:
        determine a charging time;
        determine a temperature of a battery;
        instruct a thermal control system to start heating the battery responsive to the charging time and the temperature of the battery;
        instruct a valve of the thermal control system to toggle to a heat cycle;
        instruct a heater of the thermal control system to heat thermal fluid; and
        instruct a pump to send the heated thermal fluid through a battery thermal plate.

2. The control unit of claim 1, wherein the instructions are further configured to cause the processor to:
    determine weather information; and
    determine the charging time responsive to the weather information.

3. The control unit of claim 2, wherein the weather information includes a prediction of solar information, and wherein the charging time is determined responsive to the prediction of solar information.

4. The control unit of claim 1, wherein the instructions are further configured to cause the processor to instruct the thermal control system to start cooling responsive to the charging time and the temperature of the battery, wherein the instruction to start cooling triggers sending of a fluid heated by the battery from the battery thermal plate to a cooling radiator.

5. The control unit of claim 1, wherein the instructions are further configured to cause the processor to instruct the thermal control system to start heating responsive to the temperature of the battery being below a previously defined charging temperature.

6. A system comprising:
    a thermal control system configured to manage temperature of a battery, the thermal control system comprising:
        a valve;
        a battery thermal plate;
        a heater;
        a pump; and
        a reservoir tank; and
    a control unit configured to be in signal communication with the thermal control system, the control unit including:
        a processor; and
        non-transitory computer-readable media configured to store computer-executable instructions configured to cause the processor to:
            determine a charging time;
            determine a temperature of the battery;
            instruct the thermal control system to start heating the battery responsive to the charging time and the temperature of the battery;
            instruct the valve of the thermal control system to toggle to a heat cycle;
            instruct the heater of the thermal control system to heat thermal fluid; and
            instruct the pump to send the heated thermal fluid through the battery thermal plate.

7. The system of claim 6, further comprising a communications device; and wherein the instructions are further configured to cause the processor to:
    receive weather information via the communications device; and
    determine a start charging time responsive to the received weather information.

8. The system of claim 7, wherein the weather information includes a prediction of information chosen from solar information, wind information, and temperature information and wherein the charging time is determined responsive to the prediction of information.

9. The system of claim 7, wherein the instructions are further configured to cause the processor to instruct the thermal control system to start cooling responsive to the charging time and the temperature of the battery, wherein the instruction to start cooling triggers the thermal control system to send of a fluid heated by the battery from the battery thermal plate to an air cooled radiator.

10. The system of claim 6, wherein the instructions are further configured to cause the processor to instruct the thermal control system to start heating further responsive to the temperature of the battery being below a previously defined charging temperature.

11. A method comprising:
    determining a charging time;
    determining a temperature of a battery;
    starting heating of the battery responsive to the charging time and the temperature of the battery;
    instructing a valve of a thermal control system to toggle to a heat cycle;
    instructing a heater of the thermal control system to heat thermal fluid; and
    instructing a pump to send the heated thermal fluid through a battery thermal plate.

12. The method of claim 11, wherein determining the charging time includes:
    determining weather information; and
    determining the charging time responsive to the weather information.

13. The method of claim 12, wherein the weather information includes a prediction of information chosen from solar information, wind information, and temperature information and wherein the charging time is determined responsive to the prediction of information.

14. The method of claim 11, wherein starting heating includes starting cooling responsive to the charging time and the temperature of the battery, wherein starting cooling triggers sending a fluid heated by the battery from the battery thermal plate to a cooling radiator.

15. The method of claim 11, wherein starting battery heating is further responsive to the temperature of the battery being below a previously defined charging temperature.

* * * * *